United States Patent [19]
Dixon

[11] Patent Number: 5,329,727
[45] Date of Patent: Jul. 19, 1994

[54] TOPICAL HERBAL TREATMENT APPLICATOR

[76] Inventor: Madison F. Dixon, Drawer B, Swainsboro, Ga. 30401

[21] Appl. No.: 103,764

[22] Filed: Aug. 10, 1993

[51] Int. Cl.⁵ .............................................. A01C 23/00
[52] U.S. Cl. .................................. 47/1.5; 47/1.7; 47/58; 401/10; 15/210.1
[58] Field of Search .............. 47/1.5, 1.7, 58.01; 15/209.1, 210.1; 401/10

[56] References Cited

U.S. PATENT DOCUMENTS

| | | | |
|---|---|---|---|
| 1,566,714 | 12/1925 | Wilson | 47/1.5 |
| 2,788,537 | 4/1957 | Greenberg | 401/10 |
| 2,908,923 | 10/1959 | Schlecter | 47/1.5 |
| 4,027,986 | 6/1977 | Patrick . | |
| 4,126,962 | 11/1978 | Polcaro . | |
| 4,276,719 | 7/1981 | Keeton et al. . | |
| 4,291,491 | 9/1981 | Maddock . | |
| 4,305,224 | 12/1981 | Maddock . | |
| 4,409,755 | 10/1983 | Maddock . | |
| 4,543,743 | 10/1985 | Keeton . | |
| 4,716,677 | 1/1988 | Moore | 47/1.5 |
| 4,803,801 | 2/1989 | Nelson | 47/1.5 |
| 4,947,580 | 8/1990 | Moore . | |

FOREIGN PATENT DOCUMENTS

| | | | |
|---|---|---|---|
| 81025 | 6/1951 | Czechoslovakia | 401/10 |
| 929758 | 7/1955 | Fed. Rep. of Germany | 47/1.5 |

*Primary Examiner*—Henry E. Raduazo
*Attorney, Agent, or Firm*—Richard C. Litman

[57] ABSTRACT

An applicator for the topical application of liquid treatment fluids to plants provides for remote actuation of opposed grasping or pressure plates, thereby allowing even and symmetrical pressure to be applied to the plant as the treatment liquid is administered. The result precludes uneven pressure to the plant and possible subsequent bending of the plant and contact with another adjacent plant, thereby precluding secondary application of any treatment liquid to the adjacent plant and possible injury to that adjacent plant. The application operation is easily conducted remotely, by actuating a trigger to clamp the plant in the opposed members. One of the members includes a porous sponge or pad, which pad communicates with a treatment liquid container via a tube or conduit in order to provide a positive coating of plant treatment liquid to the plant interposed between the two plates adjacent the pad. The treatment pad is shielded from inadvertent contact with adjacent plants by the two plates. A liquid treatment flow control and shutoff valve may be included in the apparatus.

20 Claims, 4 Drawing Sheets

TOPICAL HERBAL TREATMENT APPLICATOR

FIELD OF THE INVENTION

The present invention relates generally to devices for the dispensing of fluids or liquids, and more specifically to a hand held device providing for the application of a liquid treatment (e.g., herbicide) to plants.

BACKGROUND OF THE INVENTION

Many, if not most, homeowners are proud of their homes and surrounding landscaping, and are anxious to see that their property and any plantings thereon remain attractive. However, the natural state of things dictates that foreign plants or weeds will invariably take root in otherwise orderly planted areas or beds. Accordingly, many persons spend inordinate amounts of time laboriously removing such undesired plants and weeds from vegetable gardens, flower beds, and other cultivated areas. In addition, desirable plants frequently become contaminated with fungi, insects or other problems which require application of liquid treatment(s).

While the development of chemical herbicides and other treatments has made such work somewhat easier, the generally relatively isolated nature of such weeds or infected plants in an otherwise orderly area still results in the need for individual treatment or removal. Heretofore, this has required much bending and kneeling in order to treat infected plants and/or remove undesirable plants, which activity can be difficult even for the physically fit. For those who are physically handicapped, the necessary physical activities required for gardening and weeding may preclude the cultivation of planted areas by such persons.

The need arises for a hand held device capable of remotely applying topical liquid herbal treatments to plants, without requiring excessive bending or kneeling by the user. The device must be capable of applying treatment only to a specific plant or plants requiring such treatment, without risk of unneeded or potentially damaging treatment to surrounding plants. The device must be relatively light weight and relatively inexpensive, thus providing availability to the hobbyist or weekend gardener of average physical condition and means. Moreover, the device must preclude any excessive physical activity or dexterity on the part of the user.

DESCRIPTION OF THE PRIOR ART

U.S. Pat. No. 4,027,986 issued to Stanley R. Patrick on Jun. 7, 1977 discloses an Herbicide Applicator comprising a hollow tube with a single sponge applicator at the distal end. No means is provided for sandwiching the article to be treated to ensure adequate pressure and contact against a pliable plant, as in the case of the present invention. The application of the device against only one side of a plant may cause the plant to bend or be pushed against another plant to which treatment is not desired, possibly causing the second plant to be damaged or killed by secondary contact with the treatment. Moreover, no disclosure is made of any visual means for determining the quantity of treatment fluid within the device. As the sponge appears to be capable of holding a relatively large volume, the tube may be depleted while the sponge still retains some quantity of treatment liquid. Also, the means for adjusting flow by controlling airflow into the tube appears to be less than precise, as it does not directly control the outflow of treatment fluid itself.

U.S. Pat. No. 4,126,962 issued to Arthur B. Polcaro on Nov. 28, 1978 discloses a Plant Care Device essentially comprising a set of tongs having a facing sponge pad in each tip. The pads may be treated with a plant treatment liquid or the like, and portions of the plant grasped between the facing sponge pads. No remote operation is disclosed, nor is any means disclosed for supplying a continuous fluid flow to the pads, as in the present invention.

U.S. Pat. No. 4,276,719 issued to John H. Keeton et al. on Jul. 7, 1991 discloses an Herbicide Roller Application comprising a cylindrical roller on an elongate axial arm. The device includes a container cooperating with the roller and containing a plant treatment liquid. The roller must be inserted into the container each time additional liquid is needed on the roller, and the roller provides only a single surface to bear against the plant, unlike the present invention.

U.S. Pat. No. 4,291,491 issued to Mitchell E. Maddock on Sep. 29, 1981 discloses a Liquid Herbicide Applicator comprising an elongate tube with fluid reservoir and flow control valve at an upper end, and interchangeable applicator pads selectively disposed at the opposite end. The installation of the flow control valve adjacent the tank or reservoir allows a substantial quantity of potentially hazardous fluid to continue to flow through the relatively large diameter pipe comprising the handle, and no means is provided for sandwiching a plant or portion thereof between opposed pads, as in the present invention.

U.S. Pat. No. 4,305,224 issued to Mitchell E. Maddock on Dec. 15, 1991 discloses an Apparatus For Selective Application Of Herbicide. The general structure (and limitation thereof) are similar to U.S. Pat. No. '491 to the same inventor and discussed immediately above.

U.S. Pat. No. 4,409,755 issued to Mitchell E. Maddock on Oct. 18, 1983 discloses a Hand Held Liquid Herbicide Applicator similar to U.S. Pat. Nos. '491 and '224 to the same inventor and discussed above. Again, no sandwiching of the plant material between opposing pads is disclosed, and no fluid reservoir (other than the fluid contained within a hollow handle) is disclosed.

U.S. Pat. No. 4,543,743 issued to John H. Keeton et al. on Oct. 1, 1985 discloses an Herbicide Applicator similar to that disclosed in U.S. Pat. No. '719 to the same inventors and discussed above. However, this device also includes a guard to prevent inadvertent contact of the applicator with plants not desired to be treated. Nevertheless, only a single applicator surface is disclosed, which could cause the treated plant to be pushed against other plants which other plants could be damaged. At the least, the device is incapable of applying substantial positive pressure to a small, pliable plant without bending or displacing the plant substantially, thereby risking possible contact with other adjacent plants.

Finally, U.S. Pat. No. 4,947,580 issued, to James E. Moore on Aug. 14, 1990 discloses Manual Devices And Methods For Selective Application Of Chemical Substances To Plants. While two opposed tong members preclude asymmetrical pressure on the subject plant, the embodiments including a fluid reservoir require simultaneous manipulation of the tongs and the reservoir to cause fluid to be applied to the sponge or pad member of the tongs. Such simultaneous manipulation is cumbersome, and the present invention precludes such relatively complex manipulation.

None of the above noted patents, taken either singly or in combination, are seen to disclose the specific arrangement of concepts disclosed by the present invention.

SUMMARY OF THE INVENTION

By the present invention, an improved device providing for the topical application of plant treatment liquids is disclosed.

Accordingly, one of the objects of the present invention is to provide an improved plant treatment device which allows the user to apply topical treatment to a selected plant remotely, without need to bend, kneel, stoop or otherwise change posture from a standing position.

Another of the objects of the present invention is to provide an improved plant treatment device which is capable of applying a symmetrical, positive pressure to a plant in order to preclude asymmetrical force which might cause the plant to bend and contact an adjacent plant, thereby possibly transferring some amount of the applied liquid to the adjacent plant and injuring or killing that plant.

Still another of the objects of the present invention is to provide an improved plant treatment device which includes a container or reservoir for treatment liquid.

A further object of the present invention is to provide an improved plant treatment device which includes a combination liquid flow adjustment and shutoff valve, which valve may be installed immediately above the outlet end of the liquid supply tube and immediately above the applicator pad or sponge.

An additional object of the present invention is to provide an improved plant treatment device which is capable of selectively and remotely grasping a plant to apply a liquid treatment, at the control of the user.

Another object of the present invention is to provide an improved plant treatment device which provides a view and indication of the liquid quantity remaining in the reservoir and supply line, thereby providing the user with knowledge as to the requirement for replenishing the liquid supply.

A final object of the present invention is to provide an improved plant treatment device for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
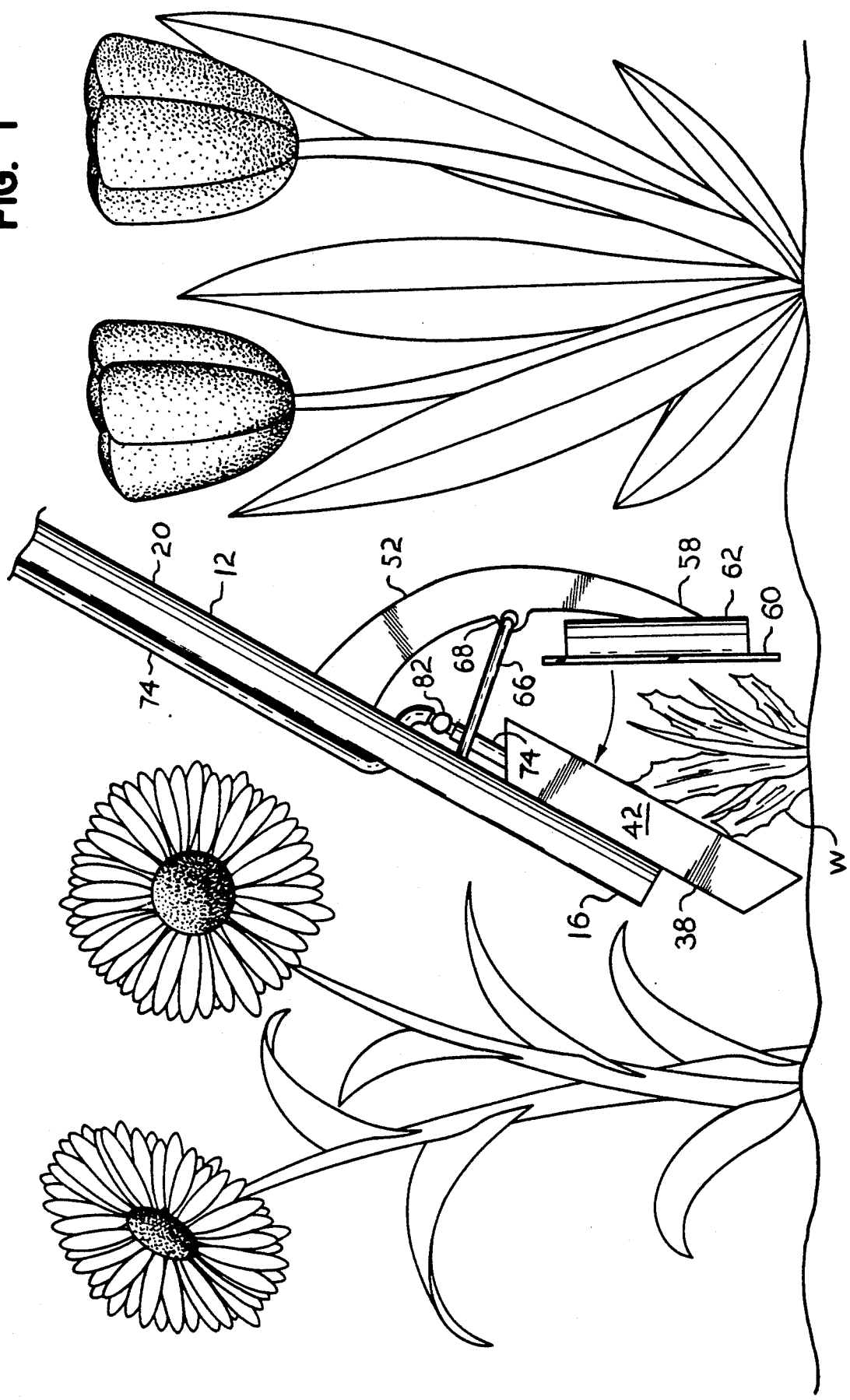
FIG. 1 is a broken away side view of the applicator end portion of the plant treatment device of the present invention, showing its use on a plant to be treated.
Figure 2:
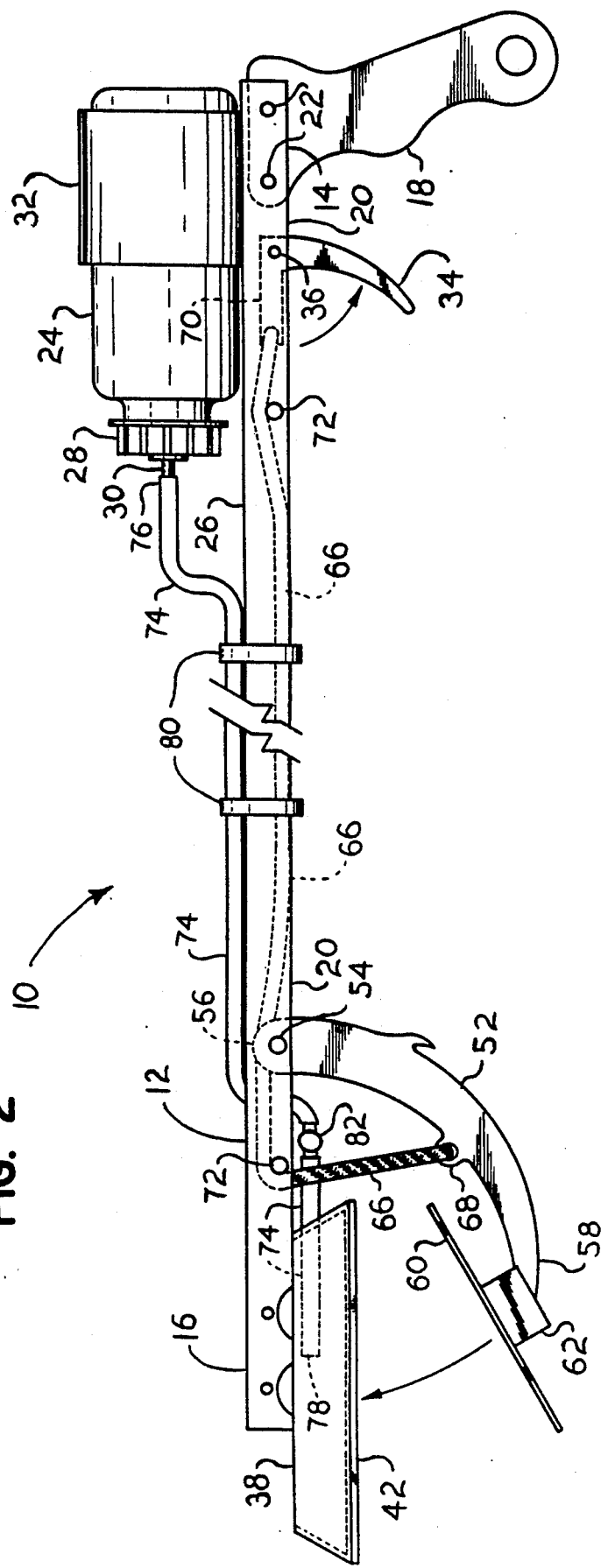
FIG. 2 is a broken side view of the present invention, showing its various components and features.
Figure 3:
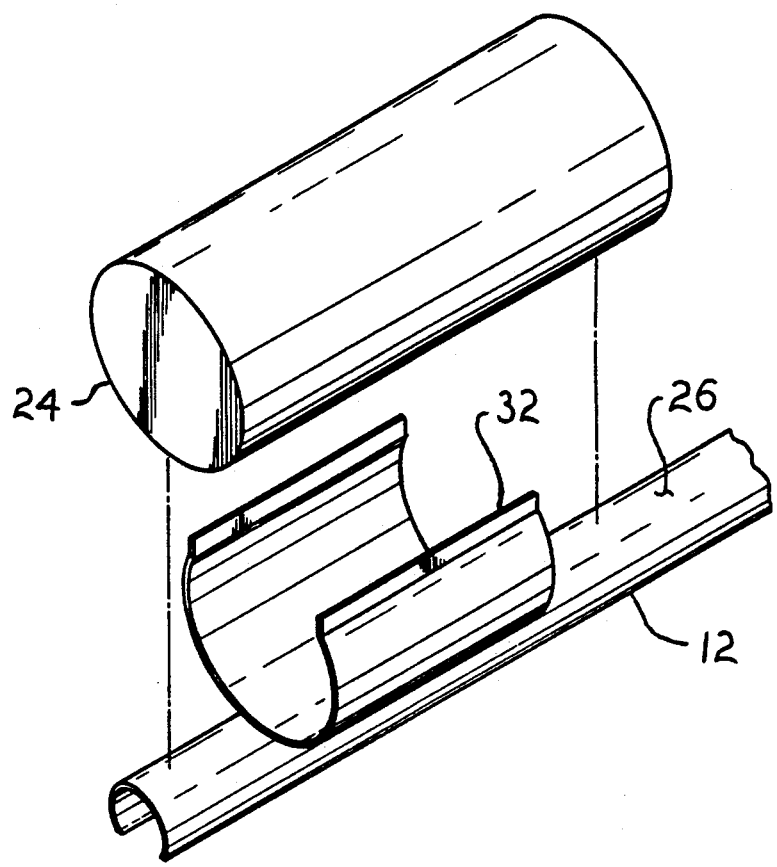
FIG. 3 is a broken away exploded perspective view of the container or reservoir portion of the present invention, showing a schematic view of the container and its installation to the remainder of the present invention.
Figure 4:
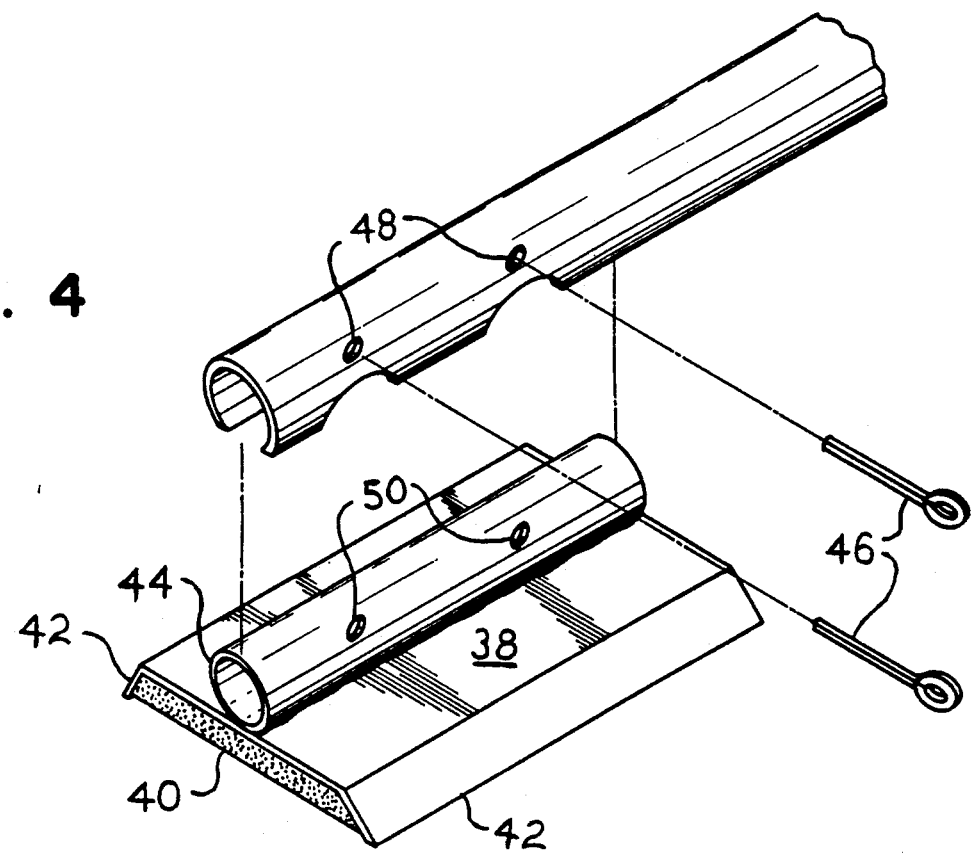
FIG. 4 is a broken away exploded perspective view showing the attachment of the applicator pad to the distal or applicator end of the present invention.
Figure 5:
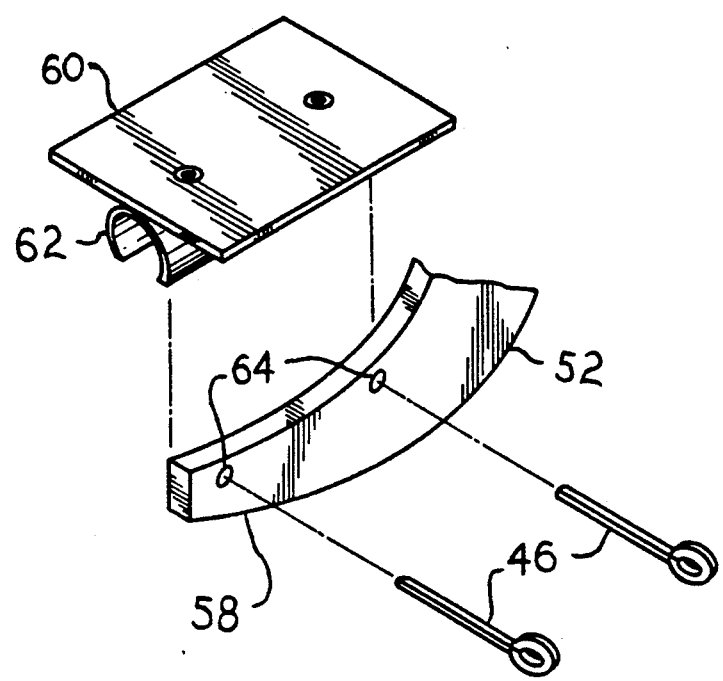
FIG. 5 is a broken away exploded perspective view showing the attachment of the movable opposed pressure plate at the applicator end.

Referring now particularly to FIG. 2 of the drawings, the present invention will be seen to relate to a plant treatment device 10 providing for the remote topical application of plant treatment liquids to various plants. Plant treatment device 10 includes an elongate shaft 12 having a first, upper or near end 14 and a second, lower or distal end 16. Shaft 12 may have a C shaped cross section as a cylindrical tube with an open side, as shown in FIGS. 3 and 4, or may have any other hollow or solid cross section as desired or required.

The first or upper end 14 preferably includes a handle or handle means 18, which handle means 18 may be secured to the lower or first side 20 of the shaft 12 by means of rivets 22, screws, etc. A reservoir 24 providing for the containment of plant treatment or other liquids, is preferably installed adjacent the first end 14 of the shaft 12, on the upper or second side 26 of the shaft 12 opposite the lower or first side 20. Reservoir 24 may be in the form of a bottle having a removable cap 28 and outlet nozzle 30, as shown, and may be removably installed by means of a spring clip 32, as shown in FIG. 3. Preferably, container or reservoir 24 is transparent, thus enabling the user to determine readily the liquid level therein: reservoir 24 may be formed of a flexible plastic, or other material as desired. In addition to the above components and features, a trigger or jaw actuating means 34 is pivotally installed in the lower side 20 of the shaft 12, coplanar with and immediately in front of the handle 18. Trigger 34 may arcuately pivot about a pin or rivet 36 installed transversely through the shaft 12, and remotely cooperates with a jaw of the device, as will be explained further below.

The opposite, distal end 16 of shaft 12 includes a first, fixed jaw or plate 38 affixed to the lower or first side 20 of the shaft 12, which plate 38 includes a porous sponge or pad 40 (FIG. 4) generally conforming to the dimensions of the plate 38 and attached thereto. In order to guard against inadvertent contact of the lateral edges of pad 40 with plants or articles to which it is not desired to apply treatment., the plate 38 may include left and right lateral shroud edges 42 if desired. Plate 38 is secured to an elongate tube 44 (FIG. 4), which tube 44 cooperates with the second end 16 of the shaft 12 to provide for the securing of plate 38 thereto. Plate 38, along with the attached pad 40, may be removably secured to the shaft 12 by means of split or cotter pins 46 (FIG. 4), screws, bolts, etc. and cooperating attachment holes 48 and 50 respectively passing through the second end 16 of the shaft 12 and the cooperating plate attachment tube 44, to provide for the ready exchange of applicator pads for different treatments as desired. Other temporary and removable attachment means for the applicator plate 38 and pad 40 may be provided as desired.

An arcuately pivotable arm 52 is also secured to the first side 20 of the shaft 12 at its attachment end 56 by means of a lateral pin or rivet 54, above the second end 16 and coplanar with the trigger means 34 and handle means 18. The opposite, distal end 58 of the arm 52 provides for the attachment of a second, arcuately movable plate 60, which second plate 60 is installed so as to face and be parallel with the first fixed plate 38 and pad 40 when the arm 52 is arcuately swung to cause the two plates 38 and 60 to be adjacent one another with the pad 40 sandwiched immediately therebetween. The second plate 60 may be removable in the manner of the first plate 38, by securing the second plate 60 to a relatively short section of C shaped channel 62 or other suitable member and pinning or otherwise removably attaching that channel or member 62 to the distal end 58 of the arm 52 by means of split or cotter pins 46, screws, bolts, etc. and cooperating attachment holes 64. Other temporary and removable attachment means may be provided as desired.

The arm 52 is actuated by means of a line 66 (cord, cable, etc.) which attaches to an attachment point 68 on the arm 52, and extends to secure to a trigger actuating arm 70 extending from the trigger means 34. One or more guides 72 may be installed along the path of the line 66 for proper positioning of the travel path of the line 66. When the trigger means 34 is operated, the line 66 is drawn toward the trigger means 34 by the trigger actuating arm 70, thus drawing the pivotable arm 52 and its attached second plate 60 toward the fixed first plate 38 and interposed pad 40. This operation serves to provide bilateral contact and symmetrical pressure upon an article (e.g., a weed W) grasped between the pad 40 and the second plate 60, thus precluding asymmetrical pressure on one side of the plant or weed W and subsequent deflecting of the plant or weed W against another plant, thereby precluding secondary contact of any applied treatment liquid from the weed W or first plant, to a second plant for which treatment is not desired.

Herbal treatment liquid may be contained within the reservoir or container 24, as noted above, and transferred to the porous pad 40 by means of a conduit 74 (clear, flexible plastic tubing or other suitable material). The conduit 74 includes a first end 76 which secures to the nozzle 30 of the container 24, and an open second end 78 installed within the porous pad 40. Thus, herbal treatment liquid may travel from the container 24 through the conduit 74, and flow from the second end 78 of the conduit 74 to saturate the porous pad 40. The conduit 74 may be retained along the shaft 12 by means of one or more conduit retainers 80 (clips, clamps, ties, etc.). A combination flow adjustment and shutoff valve, such as the needle valve 82, may be installed along the conduit 74 as desired; other types of valves (e.g., a cam or other means to pinch closed the conduit 74) may be used. Preferably, the valve 82 is installed near the pad 40, in order to avoid continuing flow of liquid downstream of the valve 82 when it is closed. However, the valve 82 may be installed elsewhere along the conduit 74, e.g., near the reservoir or container 24 for ease of access by the operator.

The present invention is used for the remote topical application of plant treatment liquids (e.g., herbicides, fungicides, insecticides, etc.) to plants. For example, if the user wishes to kill weeds in a garden or other area, he/she fills the container 24 with the appropriate liquid. The valve 82 may be opened to the extent desired once in the work area, thereby saturating the porous pad 40 with the liquid. When a weed W or other undesirable plant is located, the user of the present invention places the pad 40 immediately adjacent the weed W and actuates the jaw actuating means 34 to close the second plate 60 toward the first plate 38 and sandwich the weed W between the saturated pad 40 and the second plate 60, by remotely manipulating the handle 18 and jaw actuating means 34. The sandwiching of the weed W between the pad 40 and second plate 60 results in thorough coating of the portion of the plant or weed W in contact with the pad 40, thus ensuring a proper dosage of liquid to the plant or weed W. Releasing the trigger or jaw actuating means 34 enables the user to move to another plant or weed, repeating the process as desired. By proper adjustment of the valve 82, no excessive liquid will drip from the pad 40 to contaminate the surrounding area, and yet sufficient liquid will be provided to coat the plant or weed as desired. The above operation may be conducted without need for the user to stoop, bend, kneel, or otherwise alter posture from a standing position, all the while remotely applying the chosen liquid to the plant(s) or weed(s) by means of liquid flow from the reservoir 24 to the pad 40 by means of the conduit 74, and the remotely operated clamping means described.

While all components of the present invention may be washed and cleaned as required, those components which are in direct contact with the liquid to be applied (reservoir 24, conduit 74, first plate 38 and pad 40, and second plate 60) are removable, in order that other like components providing for the application of different liquids may be installed. For example, if the user of the present invention has been using the device to apply herbicide to undesirable plants and wishes to apply an insecticide to other plants, he/she may easily remove the various components in direct contact with the liquids and exchange them for other like components containing other liquids; there is thus no need to thoroughly wash and clean the interiors of these components to preclude the application of undesirable liquids to different plants.

It is to be understood that the present invention is not limited to the sole embodiment described above, but encompasses any and all embodiments within the scope of the following claims.

I claim:

1. A plant treatment device providing for the remote topical application of plant treatment liquids to plants, comprising:

an elongate shaft having a first end, an opposite second end, a first side, and an opposite second side;

said first end of said shaft including handle means and trigger means extending from said first side of said shaft, and a liquid reservoir disposed adjacent said second side of said shaft;

said second end of said shaft including a first plate extending from said first side, with an arcuately pivotable arm extending from said first side immediately above said first plate;

said first plate including a porous pad affixed thereto, and said arm having a distal end with a second plate secured thereto so that said second plate is parallel to and immediately adjacent said porous pad when said arcuately pivotable arm is pivoted toward said first plate;

conduit means extending between said reservoir and said porous pad and providing for liquid flow between said reservoir and said porous pad to provide for the saturation of said porous pad;

means connecting said trigger means and said pivotable arm, so that said pivotable arm is arcuately swung toward said first plate when said trigger means is actuated; and, at least said reservoir, said conduit means, said first plate with said porous pad, and said second plate are removably installable, whereby another said reservoir, said conduit means, said fist plate with said porous pad, and said second plate are temporarily installable to provide for the containment and application of a different plant treatment liquid; whereby, said plant treatment device is manipulated to place said porous pad immediately adjacent one side of a plant with the plant interposed between said porous pad and said second plate, said trigger means is actuated, and the plant is sandwiched between said porous pad and said second plate with plant treatment liquid being transferred directly to the plant from said porous pad.

2. The plant treatment device of claim 1 including:
a liquid flow control and shutoff valve installed within said conduit means.

3. The plant treatment device of claim 2 wherein:
said liquid flow control and shutoff valve is installed adjacent said porous pad.

4. The plant treatment device of claim 2 wherein:
said liquid flow control and shutoff valve comprises a needle valve.

5. The plant treatment device of claim 1 including:
left and right lateral shrouds extending from said first plate and beside said porous pad, whereby any laterally disposed adjacent plants are protected from contact with said porous pad.

6. The plant treatment device of claim 1 wherein:
said reservoir and said conduit means are transparent, whereby the quantity of any liquid contained therein is visible to a user of said plant treatment device.

7. The plant treatment device of claim 1 wherein:
said reservoir is secured to said shaft by means of a spring clip.

8. The plant treatment device of claim 1 wherein:
at least said reservoir and said conduit means are formed of flexible plastic.

9. The plant treatment device of claim 1 wherein:
at least said shaft is formed as a channel having a substantially C shaped cross section, with said first side of said shaft being open.

10. A method of using a plant treatment device providing for the remote topical application of plant treatment liquids to plants, the method comprising the following steps:

providing a plant treatment device comprising a shaft having handle means, actuating means, and reservoir means adjacent one end and first and second opposed closable plates adjacent an opposite end with the first opposed plate including a porous pad communicating with the reservoir means via a conduit and the actuating means providing for the remote closure of the second opposed plate adjacent the porous pad of the first opposed plate;

filling the reservoir mean with a plant treatment liquid and allowing the plant treatment liquid to flow through the conduit to saturate the porous pad;

remotely placing the porous pad adjacent a plant to be treated by manipulating the handle means, and manipulating the actuating means so as to sandwich the plant being treated between the second plate and the porous pad, thereby coating the plant with liquid from the saturated porous pad;

wipingly withdrawing the first and second plates from the plant and thereby further applying the treatment liquid to the plant; and, removing one reservoir means, conduit, first plate with porous pad, and second plate used for one type of plant treatment, and installing a second reservoir means, conduit, first plate with porous pad, and second plate used for another type of plant treatment.

11. The method of claim 10 including the steps of:
providing a plant treatment device including a flow control and shutoff valve installed in the conduit; and, manipulating the valve to control the flow of treatment liquid through the conduit to the porous pad.

12. A plant treatment device providing for the remote topical application of plant treatment liquids to plants, comprising:

an elongate shaft having a first end, an opposite second end, a first side, and an opposite second side;

said first end of said shaft including handle means and trigger means extending from said first side of said shaft, and a liquid reservoir disposed adjacent said second side of said shaft;

said second end of said shaft including a first plate extending from said first side, with an arcuately pivotable arm extending from said first side immediately above said first plate;

said first plate including a porous pad affixed thereto, and said arm having a distal end with a second plate secured thereto so that said second plate is parallel to and immediately adjacent said porous pad when said arcuately pivotable arm is pivoted toward said first plate;

conduit means extending between said reservoir and said porous pad and providing for liquid flow between said reservoir and said porous pad to provide for the saturation of said porous pad;

means connecting said trigger means and said pivotable arm, so that said pivotable arm is arcuately swung toward said first plate when said trigger means is actuated; and, left and right lateral shrouds extending from said first plate and beside said porous pad, whereby any laterally disposed adjacent plants are protected from contact with said porous pad; whereby, said plant treatment device is manipulated to place said porous pad immediately adjacent one side of a plant with the plant interposed between said porous pad and said second plant, said trigger means is actuated, and the plant is sandwiched between said porous pad and said second plate with plant treatment liquid being transferred directly to the plant from said porous pad.

13. The plant treatment device of claim 12 wherein:
at least said reservoir, said conduit means, said first plate with said porous pad, and said second plate are removably installable, whereby another said reservoir, said conduit means, said first plate with said porous pad, and said second plate are temporarily installable to provide for the containment and application of a different plant treatment liquid.

14. The plant treatment device of claim 12 wherein:

said reservoir is secured to said shaft by means of a spring clip.

15. The plant treatment device of claim 12 including:
a liquid flow control and shutoff valve installed within said conduit means.

16. The plant treatment device of claim 15 wherein:
said liquid flow control and shutoff valve is installed adjacent said porous pad.

17. The plant treatment device of claim 15 wherein:
said liquid flow control and shutoff valve comprises a needle valve.

18. The plant treatment device of claim 12 wherein:
said reservoir and said conduit means are transparent, whereby the quantity of liquid contained therein is visible to a user of said plant treatment device.

19. The plant treatment device of claim 12 wherein:
at least said reservoir and said conduit means are formed of flexible plastic.

20. The plant treatment device of claim 12 wherein:
at least said shaft is formed as a channel having a substantially C shaped cross section, with said first side of said shaft being open.

* * * * *